(12) United States Patent
Seki

(10) Patent No.: US 6,238,829 B1
(45) Date of Patent: May 29, 2001

(54) METHOD OF MANUFACTURING PLASMA ADDRESSED ELECTRO-OPTICAL DISPLAY

(75) Inventor: Atsushi Seki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/080,815

(22) Filed: May 19, 1998

(30) Foreign Application Priority Data

May 20, 1997 (JP) .................................................. 9-147186

(51) Int. Cl.[7] .............................. G03C 5/00; B24B 1/00; H01J 9/00; H01J 9/04; H01J 9/12
(52) U.S. Cl. ................. 430/24; 430/23; 430/28; 451/30; 451/31; 445/24; 445/50
(58) Field of Search .................... 430/24, 23, 28; 451/30, 31; 445/24, 50

(56) References Cited

U.S. PATENT DOCUMENTS

| | | | |
|---|---|---|---|
| 5,037,723 | * 8/1991 | Hwang | 430/320 |
| 5,049,980 | * 9/1991 | Saito et al. | 357/80 |
| 5,351,144 | * 9/1994 | Tanamachi | 359/54 |
| 5,672,460 | * 9/1997 | Katoh et al. | 430/198 |
| 5,793,158 | * 8/1998 | Wedding, Sr. | 313/493 |
| 5,834,896 | * 11/1998 | Hayashi et al. | 313/585 |
| 5,851,732 | * 12/1998 | Kanda | 430/321 |
| 5,860,843 | * 1/1999 | Kasahara | 445/24 |
| 5,869,919 | * 2/1999 | Sato et al. | 313/17 |
| 5,906,527 | * 5/1999 | Shaikh et al. | 445/24 |

FOREIGN PATENT DOCUMENTS 56-165244 * 12/1981 (JP) ............................................ 445/24

OTHER PUBLICATIONS

Elliott, David J. "Integrated Circuit Fabrication Technology", McGraw–Hill, pp. 27–32, 1982.*

* cited by examiner

Primary Examiner—Tom Dunn
Assistant Examiner—Jonas N. Strickland
(74) Attorney, Agent, or Firm—Sonnenschein, Nath & Rosenthal

(57) ABSTRACT

Disclosed is a method of manufacturing a plasma addressed electro-optical display having a side surface electrode structure. In the display, a display cell is superimposed on a plasma cell. The display cell includes an intermediate substrate, an upper substrate having columns of signal electrodes, and an electro-optical material held therebetween. The plasma cell includes a lower substrate joined to the intermediate substrate, and a plurality of rows of discharge channels formed therebetween and composed of discharge electrodes and barrier ribs. The method of manufacturing the above display includes a first step of forming the discharge electrodes each having side surfaces and an upper surface on a front surface of the lower substrate in a pattern of stripes; a second step of applying a photosensitive insulating material over the entire surfaces of the discharge electrodes to a specific thickness; and a third step of exposing the insulating material to light from a back surface of the lower substrate using the discharge electrodes as a mask, followed by development, to form the barrier ribs on upper surfaces of the discharge electrodes.

3 Claims, 9 Drawing Sheets

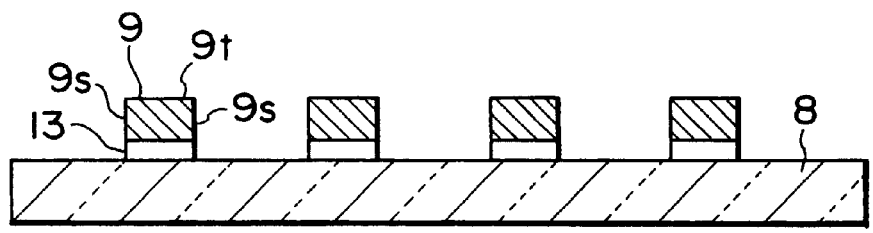
FIG. IA
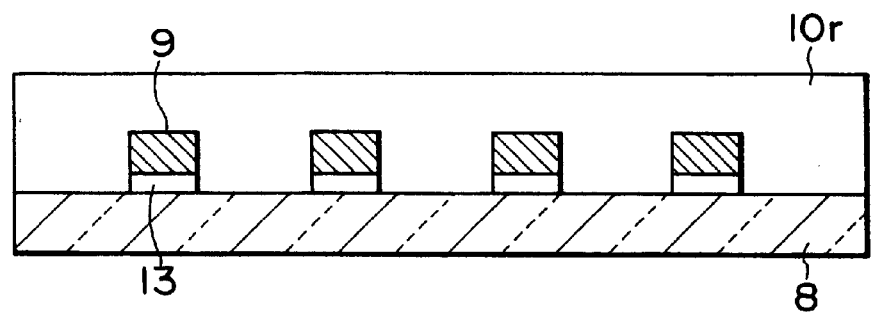
FIG. IB
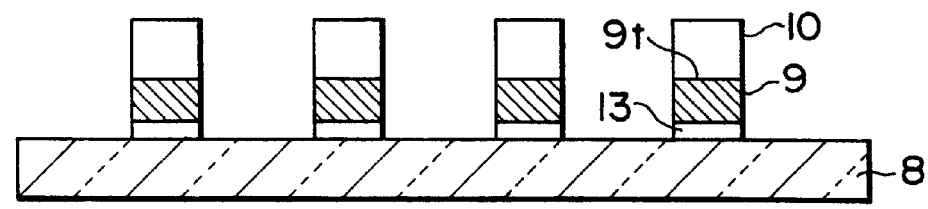
FIG. IC
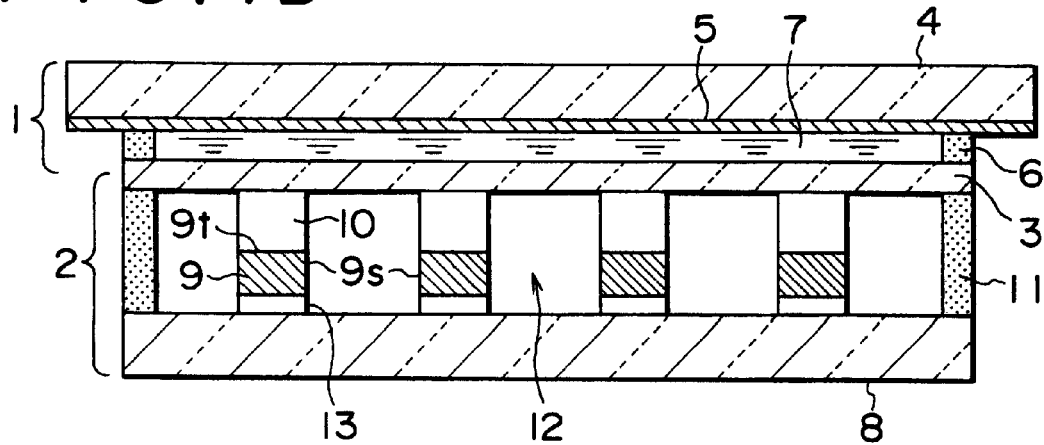
FIG. ID

1

METHOD OF MANUFACTURING PLASMA ADDRESSED ELECTRO-OPTICAL DISPLAY

BACKGROUND OF THE INVENTION

The present invention relates to a method of manufacturing a plasma addressed electro-optical display having a flat panel structure in which a display cell is superimposed on a plasma cell, and particularly to a method of manufacturing discharge electrodes and barrier ribs formed on the plasma cell.

A plasma addressed electro-optical display making use of a plasma cell for addressing a display cell has been known, for example, from Japanese Patent Laid-open No. Hei 4-265931. As shown in FIG. 7, this plasma addressed electro-optical display has a flat panel structure including a display cell 1, a plasma cell 2, and a common intermediate substrate 3 interposed therebetween. The plasma cell 2 includes a lower substrate 8 joined to the intermediate substrate 3 with a gap kept therebetween, in which gap an ionizable gas is sealed. Discharge electrodes 9 are formed on the inner surface of the lower substrate 8 in a pattern of stripes. The discharge electrodes 9 are printed and baked on the flat lower substrate 8 by a screen printing process or the like. Barrier ribs 10 are formed in such a manner that each barrier rib 10 partitions two adjacent pairs of the discharge electrodes 9 from each other, to thereby divide the gap in which the ionizable gas is sealed into discharge channels 12. The barrier ribs 10 are also printed and baked by the screen printing process or the like such that tops thereof are in contact with the lower surface of the intermediate substrate 3. A pair of discharge electrodes 9 contained in each discharge channel 12 function as an anode A and a cathode K to generate plasma discharge therebetween. The structure shown in FIG. 7, in which the anodes A and the cathodes K are formed on the same plane, is called "a planar discharge structure". In addition, the intermediate substrate 3 is joined to the lower substrate 8 with glass frit 11 or the like.

Meanwhile, the display cell 1 includes a transparent upper substrate 4. The upper substrate 4 is stuck on the intermediate substrate 3 using a sealant 6 or the like with a specific gas kept therebetween. The gap is filled with an electro-optical material such as liquid crystal 7. Signal electrodes 5 are formed on the inner surface of the upper substrate 4 in such a manner as to be perpendicular to the striped discharge channels 12. A matrix of pixels are defined at points at which the signal electrodes 5 cross the discharge channels 12.

In the plasma addressed electro-optical display having such a configuration, display drive is performed by switchingly scanning rows of the discharge channels 12 in which plasma discharge is to be performed in linear sequence and applying image signals to columns of the signal electrodes 5 on the display cell 1 side in synchronization with the scanning. The generation of plasma discharge in each discharge channel 12 between the anode A and cathode K having the flat electrode structure causes the interior of the discharge channel 12 to be uniformly at an anode potential, thus effecting pixel selection for each row. In other words, the discharge channel 12 functions as a sampling switch. Then, by applying an image signal to each pixel in a state in which such a plasma sampling switch is conductive, the sampling is performed to control turn-on/off of the pixel. After the plasma sampling switch is turned into a non-conductive state, the image signal thus sampled is held in the pixel as it is.

In the case where the above planar discharge structure is employed for a transmission type plasma addressed electro-optical display, there arises a disadvantage in which the opening ratio of the pixels is sacrificed because the light shielding discharge electrodes 9 are provided in the discharge channels 12. To cope with such a disadvantage, there has been proposed a plasma addressed electro-optical display, shown in FIG. 8, having a side surface discharge structure (also called a facing discharge structure or a wall discharge structure). In FIG. 8, for an easy understanding, parts corresponding to those of the plasma addressed electro-optical display of the planar discharge structure shown in FIG. 7 are indicated by the corresponding reference numerals. In the side surface discharge structure, a discharge channel 12 includes a pair of discharge electrodes 9 having side surfaces facing to each other and barrier ribs 10 each being matched onto the upper surface of the discharge electrode 9. The side surfaces, facing to each other, of the pair of the discharge electrodes 9 exposed in the discharge channel 12 function as an anode A and a cathode K to generate plasma discharge therebetween. Differently from the planar discharge structure, the side surface discharge structure ensures a high opening ratio because the anodes A and the cathodes K are not present on the bottom surfaces of the discharge channels 12, causing an advantage in terms of luminance.

FIG. 9 is a typical perspective view showing a method of manufacturing discharge electrodes 9 and barrier ribs 10 in the side surface discharge structure. In the related art method, the discharge electrodes 9 were formed by printing a conductive material (conductive paste) in a pattern of stripes by screen printing, and the barrier ribs 10 were formed by printing an insulating material (insulating paste) on the pattern of the discharge electrodes 9 using the same screen mask. In this method, however, since the discharge electrodes 9 or the barrier ribs 10 must be formed high to some degree, it is necessary to repeat screen printing for ensuring the thickness of the discharge electrodes 9 or the barrier ribs 10. For example, the barrier ribs 10 are formed by repeating about 10 times the screen printing. This makes the working time longer and may cause failure due to adhesion of dust. In this method, accurate positioning is also required for matching the barrier ribs 10 onto the discharge electrodes 9, which takes a lot of labor. To facilitate the positioning therebetween, the barrier ribs 10 must be laminated and printed on the discharge electrodes 9 using the same screen mask. In this case, after printing the conductive paste for forming the discharge electrodes 9, the conductive paste is required to be dried. Then, the screen mask is cleaned, and the insulating paste (a glass paste), which is exchanged from the conductive paste, is printed for forming the barrier ribs 10. The above related art manufacturing method, therefore, necessarily adopts batch processing, thereby causing a problem in mass-production.

SUMMARY OF THE INVENTION

An object of the present invention is to provide a method of manufacturing a plasma addressed electro-optical display, which is excellent in mass-productivity and production efficiency.

To achieve the above object, according to a first aspect of the present invention, there is provided a method of manufacturing a plasma addressed electro-optical display having a structure in which a display cell is superimposed on a plasma cell, the display cell including an intermediate substrate, an upper substrate having columns of signal electrodes, and an electro-optical material held therebetween, the plasma cell including a lower substrate joined to the intermediate substrate, and a plurality of rows of discharge channels formed therebetween and composed of discharge electrodes and barrier ribs, the method including: a first step of forming the discharge electrodes each having side surfaces and an upper surface on a front surface of the lower substrate in a pattern of stripes; a second step of applying a photosensitive insulating material over the entire surfaces of the discharge electrodes to a specific thickness; and a third step of exposing the insulating material to light from a back surface of the lower substrate using the discharge electrodes as a mask, followed by development, to form the barrier ribs on upper surfaces of the discharge electrodes.

The first step may include a step of forming a conductive material layer on the lower substrate to a specific thickness; a step of forming a photoresist on the surface of the conductive material layer; exposing the photoresist to light, followed by development, to pattern the photoresist into stripes; and selectively cutting off the conductive material layer by sand blasting using the striped photoresist as a mask, to form the discharge electrodes.

The first step may also include a step of forming a photosensitive conductive material layer on the lower substrate to a specific thickness; and a step of exposing the conductive material layer to light through a mask having a pattern of stripes, followed by development, to form the discharge electrodes.

The first step may further include a step of forming a photosensitive form material layer on the lower substrate to a specific thickness; a step of exposing the form material layer to light through a mask having a pattern of stripes, followed by development, to form recessed grooves of stripes in the form material layer; a step of burying the recessed grooves with a conductive material to form the discharge electrodes; and a step of removing the spent form material layer.

According to a second aspect of the present invention, there is provided a method of manufacturing a plasma addressed electro-optical display having a structure in which a display cell is superimposed on a plasma cell, the display cell including an intermediate substrate, an upper substrate having columns of signal electrodes, and an electro-optical material held therebetween, the plasma cell including a lower substrate joined to the intermediate substrate, and a plurality of rows of discharge channels formed therebetween and composed of discharge electrodes and barrier ribs, the method including: a first step of forming a conductive material layer over the entire surface of the lower substrate to a specific thickness; a second step of forming a photosensitive insulating material over the entire surface of the conductive material layer to a specific thickness; a third step of exposing the insulating material through a mask having a pattern of stripes, followed by development, to form the barrier ribs; and a fourth step of selectively cutting off the conductive material layer by sand blasting using the barrier ribs as a mask, to form the discharge electrodes having exposed side surfaces.

According to a third aspect of the present invention, there is provided a method of manufacturing a plasma addressed electro-optical display having a structure in which a display cell is superimposed on a plasma cell, the display cell including an intermediate substrate, an upper substrate having columns of signal electrodes, and an electro-optical material held therebetween, the plasma cell including a lower substrate joined to the intermediate substrate, and a plurality of rows of discharge channels formed therebetween and composed of discharge electrodes and barrier ribs, the method including: a first step of forming a conductive material layer over the entire surface of the lower substrate to a specific thickness; a second step of forming an insulating material over the entire surface of the conductive material layer to a specific thickness; a third step of forming a photoresist over the entire surface of the insulating material, followed by exposure and development, to pattern the photoresist into stripes; and a fourth step of continuously cutting off the insulating material and the conductive material layer by sand blasting using the patterned photoresist as a mask, to form the discharge electrodes having exposed side surfaces and the barrier ribs matched on upper surfaces of the discharge electrodes.

According to the present invention, there can be realized a method of effectively manufacturing a plasma addressed electro-optical display having a side surface discharge structure which has an advantageous opening ratio. The use of sand blasting and photolithography in place of the related art printing process using a screen mask or the like realizes processing capable of facilitating positioning between discharge electrodes and barrier ribs and enhancing mass-productivity. The sand blasting is performed by abrasives such as glass beads or particles of SiC or alumina at a high pressure, to cut off a conductive material or insulating material. The abrasives have an average particle size of about 30 $\mu$m. Further, the photolithography is used to expose a photosensitive material to light, to pattern the photosensitive material into stripes. According to the first aspect of the present invention, discharge electrodes are formed into a pattern of stripes and a positive type photosensitive insulating material are applied over the entire surfaces of the discharge electrodes. Then, the insulating material is exposed to light from the back surface of the substrate, followed by development, to form barrier ribs. In addition, with respect to the positive type photosensitive material, a region irradiated with ultraviolet rays at the exposure step is removed by development. According to the second aspect of the present invention, a conductive material is printed over the entire surface of a substrate and then a photosensitive insulating material is applied similarly over the entire surface. The photosensitive insulating material is exposed to light, to be patterned into stripes. The patterned stripes of the insulating material form barrier ribs. Then, the conductive material is cut off by sand blasting using the patterned stripes of the insulating material as a mask, to form discharge electrodes. According to the third aspect of the present invention, a conductive material and an insulating material are overlappingly applied over the entire surface of a substrate, followed by sand blasting using a photoresist that has been patterned into stripes by photolithography, to continuously form barrier ribs and discharge electrodes. In this way, according to the present invention, by a combination of sand blasting and photolithography, a plasma cell having a side surface discharge structure can be manufactured by not batch processing as in the related art method but continuous processing (in-line processing or stream processing).

BRIEF DESCRIPTION OF THE DRAWINGS

FIGS. 1A to 1D are process diagrams in side view showing a first embodiment of a method of manufacturing a plasma addressed electro-optical display according to the present invention;

DETAILED DESCRIPTION OF PREFERRED EMBODIMENTS

Figure 2A:
FIGS. 2A to 2F are process diagrams in side view showing an example of a method of forming discharge electrodes.
Figure 2B:
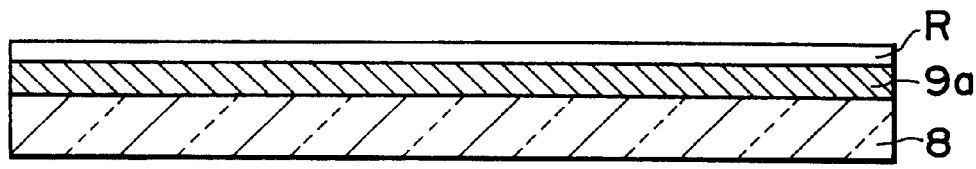
Figure 2C:
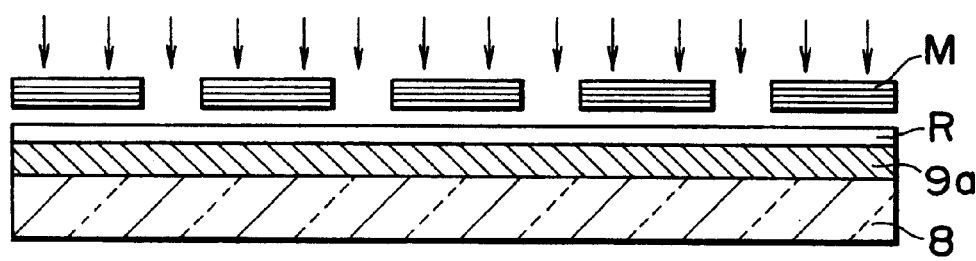
Figure 2D:
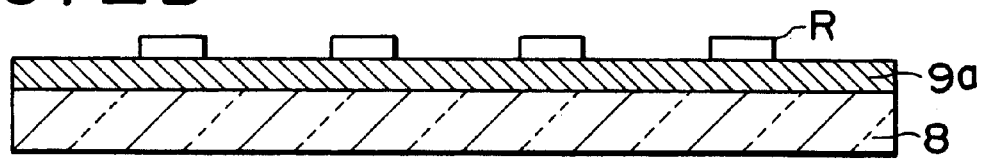
Figure 2E:
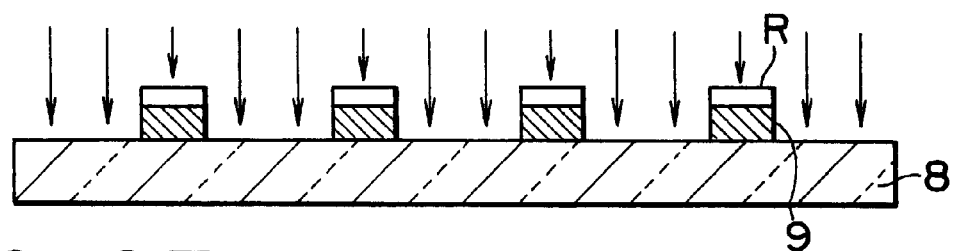
Figure 2F:
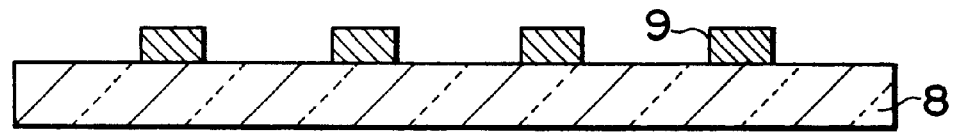

Hereinafter, preferred embodiments of the present invention will be described with reference to the accompanying drawings. FIGS. 1A to 1D are process diagrams showing a first embodiment of a method of manufacturing a plasma addressed electro-optical display according to the present invention. First, at the step shown in FIG. 1A, an under coat 13 is formed on a transparent substrate 8 made from glass or the like in a pattern of stripes. The discharge electrodes 9 can be formed by, for example, screen printing. To be more specific, conductive paste is printed to a specific thickness by screen printing, followed by baking at a temperature of, for example, about 600° C., to obtain the discharge electrodes 9. In addition, the under coat 13, which is interposed for enhancing adhesiveness between the glass substrate 8 and the discharge electrodes 9, can be formed by printing and baking glass paste or the like. The under coat 13 is not an essential element, and may be omitted. The thickness of the undercoat is typically about 10 µm, and the thickness of the discharge electrodes 9 is typically in a range of 40 to 80 µm. Then, at the step shown in FIG. 1B, a photosensitive insulating material 10r is applied to a specific thickness over the entire surfaces of the discharge electrodes 9. The thickness is typically in a range of 30 to 100 µm. The insulating material 10r is formed by dispersing fine particles of glass or ceramic in a positive type photosensitive resin, and adjusting the viscosity by addition of a specific solvent. At the step shown in FIG. 1C, the insulating material 10r is exposed to light from the back surface of the glass substrate 8 using the discharge electrodes 9 as a mask, followed by development, to thereby process the insulating material 10r into barrier ribs 10 matched onto upper surfaces 9t of the discharge electrodes 9. The exposure from the back surface of the glass substrate 8 does not allow sensitization of only portions of the insulating material 10r positioned on the light shielding discharge electrodes 9 which function as the mask. The insulating material 10r is basically formed of the positive type photosensitive resin, and consequently, only the portions of the insulating material 10r positioned on the discharge electrodes 9, which are not sensitized, remain by development. By baking these remaining portions of the insulating material 10r at a specific temperature, the barrier ribs 10 are formed. As a result, there is obtained a side surface discharge structure in which a height from the surface of the substrate 8 to the tops of the barrier ribs 10 reaches a value in a range of 150 to 300 µm. This manufacturing method allows continuous processing, without the need of positioning between the discharge electrodes 9 and the barrier ribs 10, and further, this method simplifies the steps because the barrier ribs 10 can be formed only by entirely applying the insulating material 10r, followed by exposure and development.

The process goes on to the step shown in FIG. 1D at which a plasma addressed electro-optical display is assembled using the substrate 8 on which the discharge electrodes 9 and the barrier ribs 10 are formed in a pattern of stripes. This display has a flat panel structure in which a display cell 1 is superimposed on a plasma cell 2. The display cell 1 includes an intermediate substrate 3, an upper substrate 4 having columns of signal electrodes 5, and an electro-optical material such as liquid crystal 7 held in a gap therebetween. The upper substrate 4 is joined to the intermediate substrate 3 through a sealant 6 or the like. Meanwhile, the plasma cell 2 includes a lower substrate 8 joined to the intermediate substrate 3 through glass frit 11 with a gap kept therebetween, in which gap rows of discharge channels 12 are formed. Each discharge channel 12 includes a pair of the discharge electrodes 9 having side surfaces 9s facing to each other, and the barrier ribs 10 matched on the upper surfaces 9t of the discharge electrodes 9.

FIGS. 2A to 2F are process diagrams showing an example of a method of forming the discharge electrodes 9 shown in FIG. 1A. In this example, the discharge electrodes 9 are formed in a pattern of stripes by sand blasting in place of screen printing. In this example, the formation of the under coat shown in FIG. 1A is omitted for an easy understanding; however, the under coat may be formed in the same manner as that at the step shown in FIG. 1A. Further, the technique in this example can be applied to formation of the barrier ribs 10. At the step shown in FIG. 2A, a conductive material 9a is applied on a substrate 8 to a specific thickness. Specifically, conductive paste formed by dispersing particles of a metal in a resin as a binder and suitably adjusting the viscosity by addition of a solvent is printed over the entire surface. The printing may be replaced with blade coating. Alternatively, a film-like conductive material may be laminated. In this specification of the present invention, applying of a material over the entire surface generally includes printing, blade coating, lamination, and the like. Then, at the step shown in FIG. 2B, a photoresist R is formed on the surface of the conductive material 9a applied over the entire surface. For example, a film resist having a thickness of 30 µm is laminated. At the step shown in FIG. 2C, the photoresist B is exposed to ultraviolet rays or the like through a specific mask M. At the step shown in FIG. 2D, the photoresist R is patterned in stripes by development. Here, the photoresist R of a negative type is used, and accordingly, only portions of the photoresist R irradiated with ultraviolet rays remain into stripes. The development is performed using, for example, a water solution containing 0.2% of sodium carbonate ($Na_2CO_3$). At the step shown in FIG. 2E, the conductive material 9a is selectively cut off by sand blasting using the patterned photoresist R as a mask, to thereby process the conductive material 9a into the discharge electrodes 9. The sand blasting is performed by blasting abrasives such as glass beads or particles of SiC having an average particle size of about 30 µm at a high pressure. At the step shown in FIG. 2F, the spent photoresist R is released using organic alkali such as monoethanol amine as a release agent. Finally, the conductive material is baked, to thus complete the formation of the discharge electrodes 9.

Figure 3A:
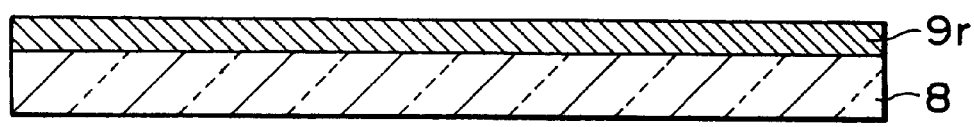
FIGS. 3A to 3C are process diagrams in side view showing another example of the method of forming the discharge electrodes.
Figure 3B:
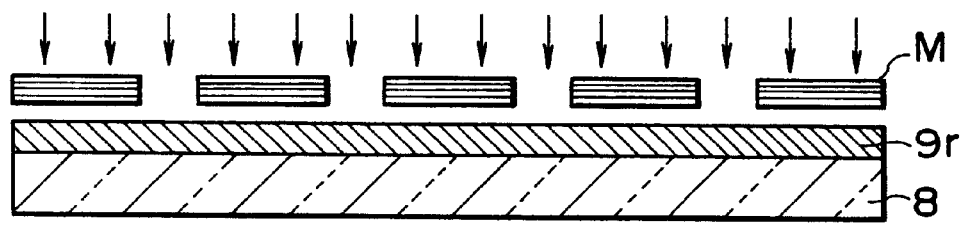
Figure 3C:
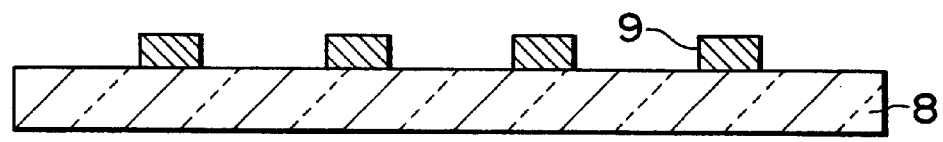
Figure 4A:
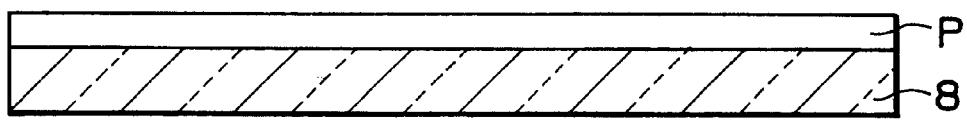
FIGS. 4A to 4E are process diagrams in side view showing a further example of the method of forming the discharge electrodes.
Figure 4B:
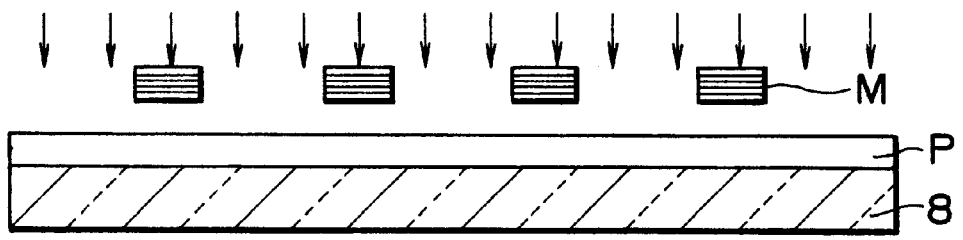
Figure 4C:
Figure 4D:
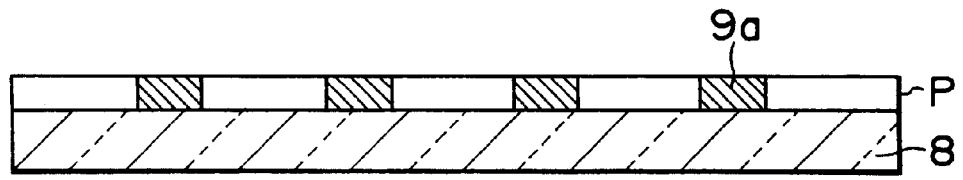
Figure 4E:
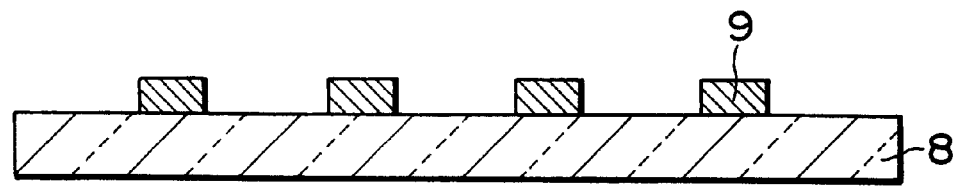

FIGS. 3A to 3C are process diagrams showing another example of the method of forming the discharge electrodes using photolithography. At the step shown in FIG. 3A, a photosensitive conductive material 9r is applied on a substrate 8 to a specific thickness. Here, photosensitive conductive paste formed by dispersing particles of a metal in a photosensitive resin and suitably adjusting the viscosity by addition of a solvent is printed over the entire surface. At the step shown in FIG. 3B, after drying the conductive material 9r, it is exposed to light through a mask M having a pattern of stripes. Finally, at the step shown in FIG. 3C, the photosensitive conductive material 9r is developed using, for example, a water solution containing sodium carbonate, followed by baking at a specific temperature, to obtain discharge electrodes 9.

FIGS. 4A to 4E are process diagrams showing a further example of the method of forming the discharge electrodes using a so-called burying process. At the step shown in FIG. 4A, a form material P is applied on a substrate 8 to a specific thickness. Here, a film resist having a thickness of 100 to 150 μm is laminated. At the step shown in FIG. 4B, the form material P is exposed to light through a mask M having a pattern of stripes. At the step shown in FIG. 4C, the form material P is developed using a weak alkali solution, to form recessed grooves G in a pattern of stripes. At the step shown in FIG. 4D, the recessed grooves G are buried with a conductive material 9a, for example, conductive paste, to form discharge electrodes. In this case, the burying can be performed using a blade coating process. Finally, at the step shown in FIG. 4E, the spent form material P is removed using a strong alkali release solution, followed by baking at a specific temperature, to form the discharge electrodes 9.

Figure 5A:
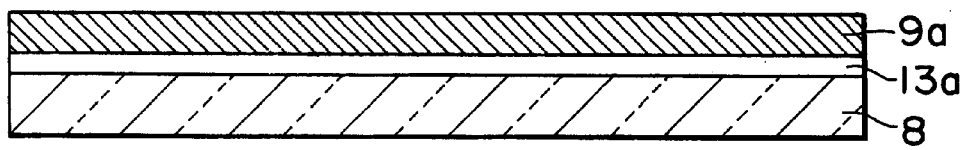
FIGS. 5A to 5E are process diagrams in side view showing a second embodiment of a method of manufacturing a plasma addressed electro-optical display according to the present invention.
Figure 5B:
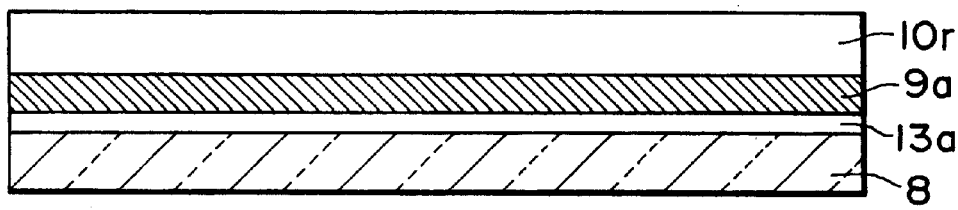
Figure 5C:
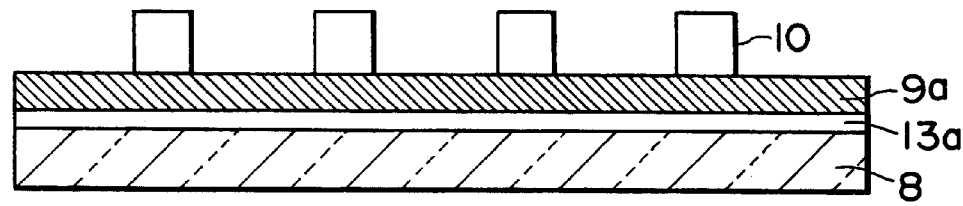
Figure 5D:
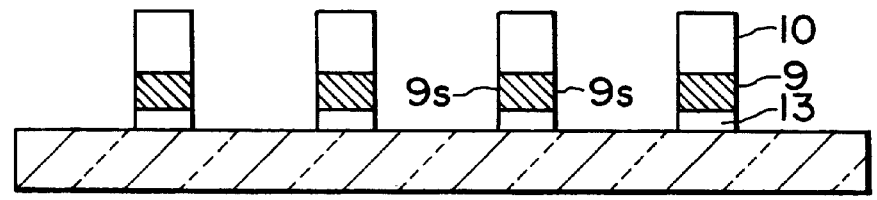
Figure 5E:
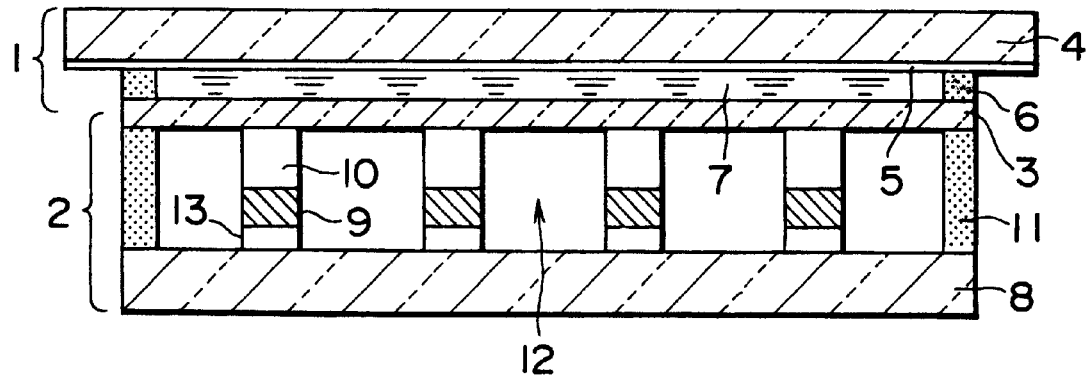
Figure 6A:
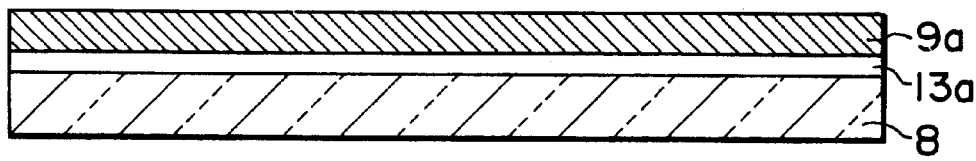
FIGS. 6A to 6E are process diagrams in side view showing a third embodiment of a method of manufacturing a plasma addressed electro-optical display according to the present invention.
Figure 6B:
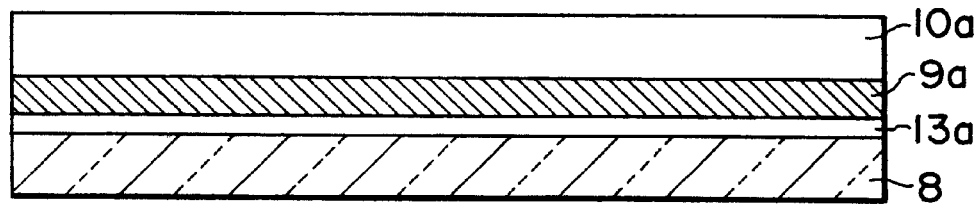
Figure 6C:
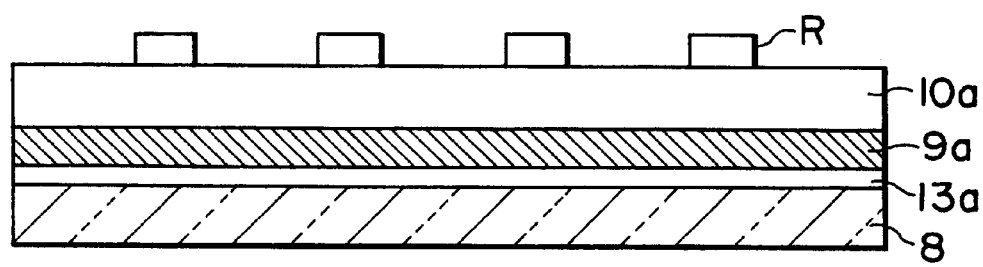
Figure 6D:
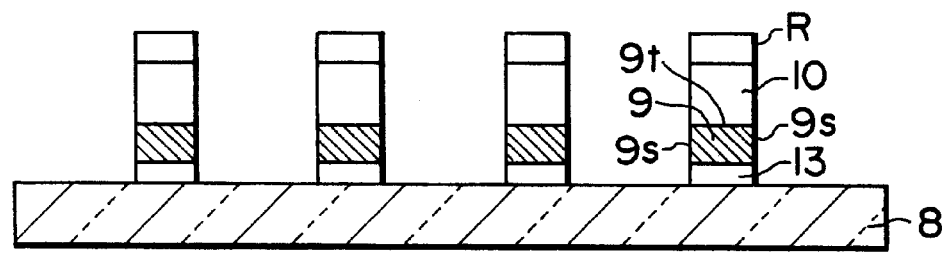
Figure 6E:
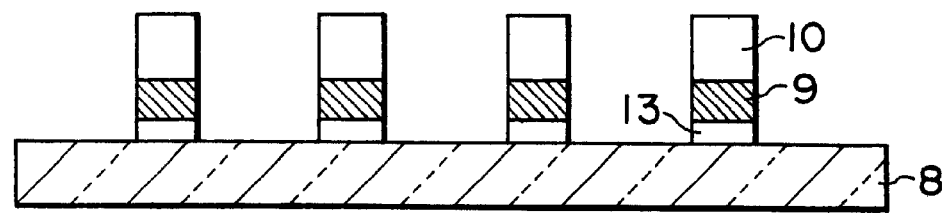
Figure 7:
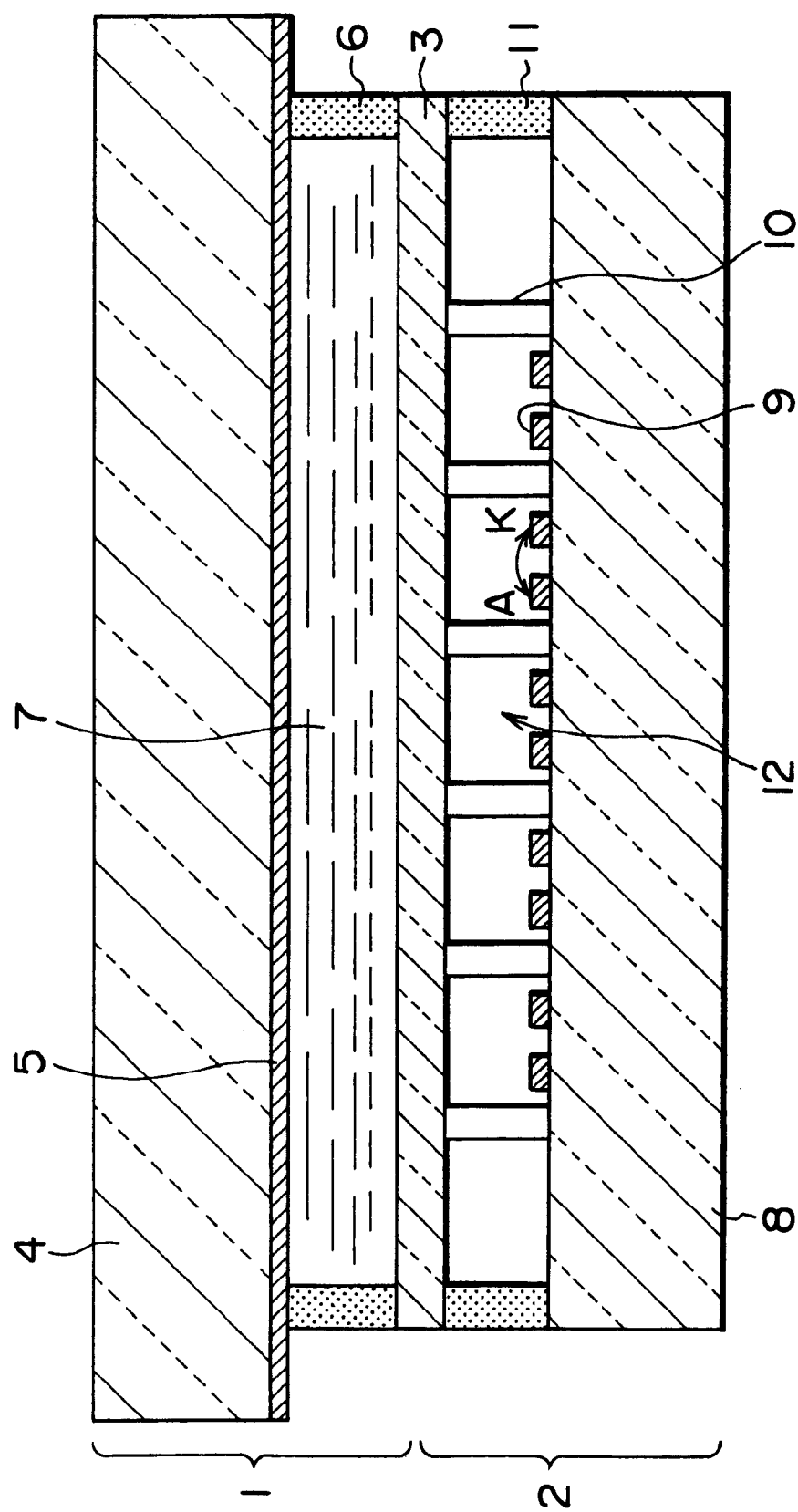
FIG. 7 is a sectional view showing a related art plasma addressed electro-optical display having a planar electrode structure.
Figure 8:
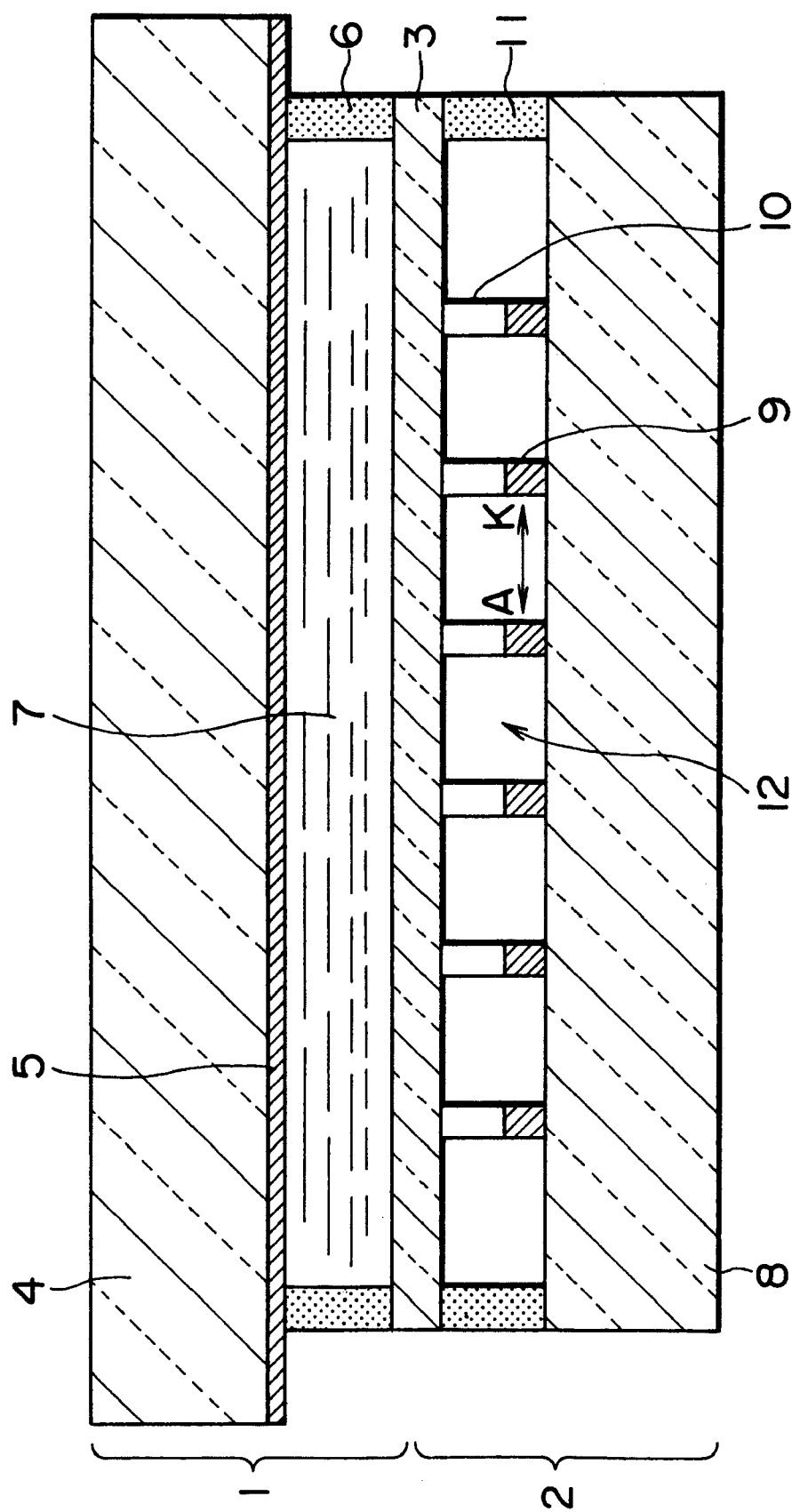
FIG. 8 is a sectional view showing a related art plasma addressed electro-optical display having a side surface electrode structure.
Figure 9:
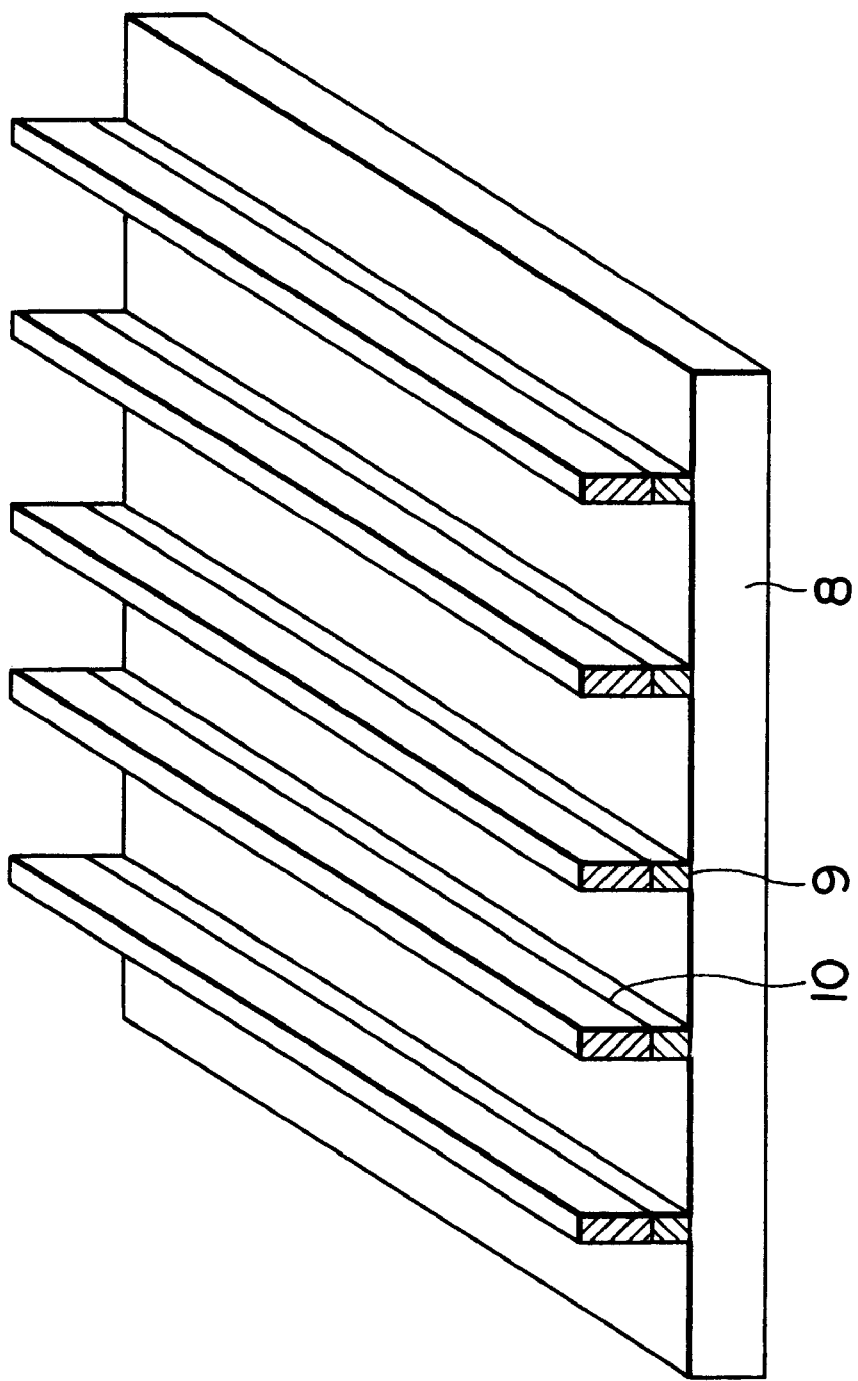
FIG. 9 is a typical perspective view showing a side surface electrode structure.

FIGS. 5A to 5E are process diagrams showing a second embodiment of a method of manufacturing a plasma addressed electro-optical display according to the present invention. At the step shown in FIG. 5A, an under coat 13a and a conductive material 9a are sequentially applied over the entire surface of a substrate 8 each to a specific thickness. Here, the conductive material 9a is solid-printed and is then dried. At the step shown in FIG. 5B, a photosensitive insulating material 10r is applied over the entire surface of the conductive material 9a to a specific thickness. Here, insulating paste in which particles of glass are dispersed in a positive type photosensitive resin is used. In addition, since the insulating material 10r is used as a mask for sand blasting in the subsequent step, the content of the resin as a binder in the insulating material 10r is set to be larger than that in usual insulating paste for imparting a desirable resistance against sand blasting to the insulating material 10r. At the step shown in FIG. 5C, the insulating material 10r is exposed to light through a mask (not shown) having a pattern of stripes, followed by development, to thereby process the insulating material 10r into barrier ribs 10. At the step shown in FIG. 5D, the conductive material 9 is selectively cut off by sand- blasting the conductive material 9 using as a mask the barrier ribs 10 previously imparted with the resistance against sand blasting, to process the conductive material 9 into discharge electrodes 9 having side surfaces 9s. At this time, the under coat 13 is simultaneously cut off into stripes. Then, the under coat 13, discharge electrodes 9 and the barrier ribs 10 are baked, and a plasma addressed electro-optical display is assembled as shown in FIG. 5E. Even this method according to the second embodiment allows continuous processing, without the need of positioning between the discharge electrodes and the barrier ribs, and further, this method simplifies the step of applying an insulating material for forming barrier ribs.

FIGS. 6A to 6E are process diagrams showing a third embodiment of a method of manufacturing a plasma addressed electro-optical display according to the present invention. At the step shown in FIG. 6A, an under insulating material 13a and a conductive material 9a are sequentially applied over the entire surface of a substrate 8 each to a specific thickness. Concretely, the under insulating material 13a is sold-printed and dried, and then the conductive material 9a is solid-printed and dried. Here, the specific thickness is ensured by repeating a specific number of sold-printing. The conductive material 9a may be applied at a time by blade coating, or a film-like conductive material may be laminated. This is effective to simplify the step because of elimination of the need of repeated printing. At the step shown in FIG. 6B, an insulating material 10a is applied over the entire surface of the conductive material 9a to a specific thickness. Here, insulating paste in which particles of glass are dispersed in a resin as a binder is solid-printed through a screen mask and is then dried. Differently from stripe printing, solid-printing is advantageous in ease of preparation of the screen mask and in economical efficiency. At the steps shown in FIG. 6C, a photoresist R is formed over the entire surface of the insulating material 10a, followed by exposure and development, to pattern the photoresist R into stripes. Here, a negative type photoresist film is laminated, and a water solution containing 0.2% of sodium carbonate is used as a developing solution. At the step shown in FIG. 6D, the insulating material 10a, conductive material 9a, and under insulating material 13a are continuously cut off by sand blasting the materials using the patterned photoresist R as a mask, to process the materials into an under coat 13, discharge electrodes 9 having exposed side surfaces 9s, and barrier ribs 10 matched on upper surfaces 9t of the discharge electrodes 9. The sand blasting is performed by blasting abrasives such as glass beads or particles of SiC or $Al_2O_3$ having an average particle size of typically 30 μm at a high pressure. Finally, at the step shown in FIG. 6E, the spent photoresist R is removed by a release agent such organic alkali, and then the barrier ribs 10, discharge electrodes 9 and under coat 13 are baked. In this embodiment, since the under insulating material 13a, conductive material 9a and insulating material 10a are all solid-printed, it is possible to eliminate the need of printing using a common screen mask having a stripe pattern as in the related art method, and hence to effect not batch processing but continuous processing. Also, according to the related art method, since striped barrier ribs are matched with striped discharge electrodes using a positioning mechanism containing image processing, the equipment cost is high and the working time is long. In this embodiment, however, since the need of positioning between discharge electrodes and barrier ribs is eliminated, it is possible to simplify the manufacturing apparatus and reduce the number of manufacturing steps.

As described above, according to the present invention, in a method of manufacturing a plasma addressed electro-optical display having a side surface discharge structure that is advantageous in opening ratio, since discharge electrodes and barrier ribs are formed by a combination of sand blasting and photolithography in place of the related art stripe pattern printing using a screen mask, it is possible to facilitate positioning between the discharge electrodes and barrier ribs and to enhance mass-production of the displays.

While the preferred embodiments of the present invention have been described using specific terms, such description is for illustrative purposes only, and it is to be understood that changes and variations may be made without departing from the spirit of scope of the following claims.

What is claimed is:

1. A method of manufacturing a plasma addressed electro-optical display having a structure in which a display cell is provided on a plasma cell, the display cell including an intermediate substrate, an upper substrate having columns of signal electrodes, and an electro-optical material held therebetween, the plasma cell including a lower substrate joined to the intermediate substrate, and a plurality of rows of discharge channels formed therebetween and composed of discharge electrodes and barrier ribs, said method comprising:

a first step of forming the discharge electrodes each having side surfaces and an upper surface on a front surface of the lower substrate in a pattern of stripes, the first step comprising the steps of:

forming a conductive material layer on the lower substrate to a specific thickness;

forming a photoresist on the surface of the conductive material layer;

exposing the photoresist to light, followed by development, to pattern the photoresist into stripes; and selectively cutting off the conductive material layer by sand blasting using the striped photoresist as a mask, to form the discharge electrodes, said selectively cutting step exposing side surfaces of said discharge electrodes;

a second step of applying a photosensitive insulating material over the entire surfaces of the discharge electrodes to a specific thickness; and a third step of exposing the photosensitive insulating material to light from a back surface of the lower substrate using the discharge electrodes as a mask, followed by development, to form the barrier ribs on upper surfaces of the discharge electrodes, said barrier ribs being of a same width as said discharge electrodes, said development revealing said side surfaces of said discharge electrodes for generation of a plasma discharge in said discharge channels.

2. A method of manufacturing a plasma addressed electro-optical display having a structure in which a display cell is provided on a plasma cell, the display cell including an intermediate substrate, an upper substrate having columns of signal electrodes, and an electro-optical material held therebetween, the plasma cell including a lower substrate joined to the intermediate substrate, and a plurality of rows of discharge channels formed therebetween and composed of discharge electrodes and barrier ribs, said method comprising:

a first step of forming a conductive material layer over the entire surface of the lower substrate to a specific thickness;

a second step of forming a photosensitive insulating material over the entire surface of the conductive material layer to a specific thickness;

a third step of exposing the photosensitive insulating material through a mask having a pattern of stripes, followed by development, to form the barrier ribs; and a fourth step of selectively cutting off the conductive material layer by sand blasting using the barrier ribs as a mask, to form the discharge electrodes having exposed side discharge surfaces.

3. A method of manufacturing a plasma addressed electro-optical display having a structure in which a display cell is provided on a plasma cell, the display cell including an intermediate substrate, an upper substrate having columns of signal electrodes, and an electro-optical material held therebetween, the plasma cell including a lower substrate joined to the intermediate substrate, and a plurality of rows of discharge channels formed therebetween and composed of discharge electrodes and barrier ribs, said method comprising:

a first step of forming a conductive material layer over the entire surface of the lower substrate to a specific thickness;

a second step of forming an insulating material over the entire surface of the conductive material layer to a specific thickness;

a third step of forming a photoresist over the entire surface of the insulating material, followed by exposure and development, to pattern the photoresist into stripes; and a fourth step of continuously cutting off the insulating material and the conductive material layer by sand blasting using the patterned photoresist as a mask, to form the discharge electrodes having exposed side discharge surfaces and the barrier ribs matched on upper surfaces of the discharge electrodes.

* * * * *